United States Patent
DeBruhl

(10) Patent No.: US 10,851,996 B2
(45) Date of Patent: Dec. 1, 2020

(54) TURBULATORS FOR COOLING HEAT SHIELD OF A COMBUSTOR

(71) Applicant: Rolls-Royce North American Technologies Inc., Indianapolis, IN (US)

(72) Inventor: Christopher Dwayne DeBruhl, Indianapolis, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 251 days.

(21) Appl. No.: 16/029,060

(22) Filed: Jul. 6, 2018

(65) Prior Publication Data

US 2020/0011531 A1 Jan. 9, 2020

(51) Int. Cl.
*F23R 3/00* (2006.01)

(52) U.S. Cl.
CPC .... *F23R 3/002* (2013.01); *F23R 2900/03045* (2013.01)

(58) Field of Classification Search
CPC .............. F23R 3/002; F23R 2900/03045
See application file for complete search history.

(56) References Cited

U.S. PATENT DOCUMENTS

| | | |
|---|---|---|
| 4,843,825 A | 7/1989 | Clark |
| 4,934,145 A | 6/1990 | Zeisser |
| 6,032,457 A * | 3/2000 | McKinney ............... F23R 3/10 60/740 |
| 7,509,813 B2 | 3/2009 | Stastny |
| 7,748,221 B2 | 7/2010 | Patel et al. |
| 2004/0083735 A1 | 5/2004 | Borns et al. |
| 2008/0104962 A1 | 5/2008 | Patel et al. |
| 2016/0169522 A1 | 6/2016 | Cunha et al. |
| 2016/0298846 A1 | 10/2016 | Papple et al. |

FOREIGN PATENT DOCUMENTS

| | | |
|---|---|---|
| EP | 2 685 170 A1 | 1/2014 |
| EP | 3 032 176 A1 | 6/2016 |
| JP | S60-135606 A | 7/1985 |
| WO | WO 2004/035992 A1 | 4/2004 |

OTHER PUBLICATIONS

Extended European Search Report, issued in European Application 19178852.0, dated Jul. 11, 2019, pp. 1-8, European Patent Office, Munich, Germany.

* cited by examiner

*Primary Examiner* — Steven M Sutherland
(74) *Attorney, Agent, or Firm* — Brinks Gilson & Lione

(57) ABSTRACT

Heat shields and methods of cooling a heat shield are provided. A heat shield of a combustor may be cooled. The heat shield comprises a first surface and a second surface, where the first surface is opposite the second surface, and the first surface is configured to face a combustion chamber. The heat shield may be cooled by directing airflow over the heat shield through channels towards an opening of the heat shield and past turbulators located in the channels.

16 Claims, 3 Drawing Sheets

TURBULATORS FOR COOLING HEAT SHIELD OF A COMBUSTOR

TECHNICAL FIELD

The present disclosure relates to cooling a heat shield of a combustor.

BACKGROUND

Gas turbine engines include a combustor where a mixture of fuel and air is ignited to complete a combustion process. Due to the large amounts of heat generated in a combustion engine, heat shields are used throughout the combustor to protect specific components of the combustor from heat damage. Present approaches of cooling heat shields for combustors suffer from a variety of drawbacks, limitations, and disadvantages. There is a need for the inventive heat shield arrangement, systems, and methods disclosed herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
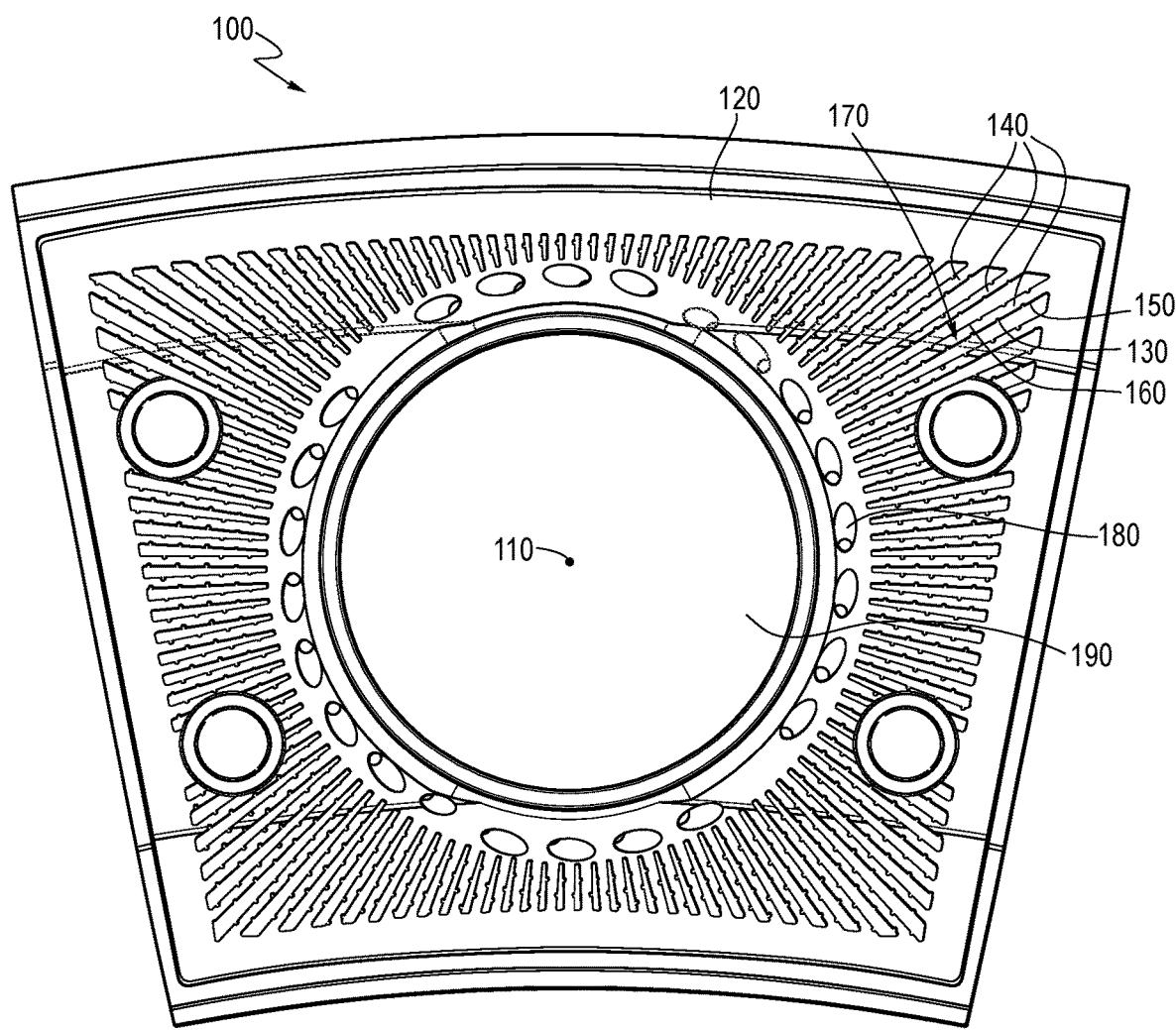
FIG. 1 illustrates a combustor dome heat shield with turbulators and radial channels.

Disclosed herein are examples of heat shields and heat shield configurations that may be used in a combustor section of gas turbine engines for any industry, such as, for example, to power aircraft, watercraft, power generators, and the like.

Generally, a gas turbine engine may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine may take a variety of forms in various embodiments. In some forms, the gas turbine engine may have multiple spools and/or may be a centrifugal or mixed centrifugal/axial flow engine. In some forms, the gas turbine engine may be a turboprop, a turbofan, or a turboshaft engine. Furthermore, the gas turbine engine may be an adaptive cycle and/or variable cycle engine. Other variations are also contemplated.

The gas turbine engine may include an intake section, a compressor section, a combustion section, a turbine section, and an exhaust section. The combustion section may include one or more combustors. Each combustor may include a combustor dome, and a liner defining a combustion chamber.

During operation of the gas turbine engine, fluid received from the intake section, such as air, travels in the direction from the intake section towards the compressor section, and may be compressed within the compressor section. The compressed fluid may then be mixed with fuel and the mixture may be burned in the combustion section, specifically in the combustion chamber. The combustion section may include any suitable fuel injection and combustion mechanisms. The hot, high pressure fluid may then pass through the turbine section to extract energy from the fluid and cause a turbine shaft of a turbine in the turbine section to rotate, which in turn drives the compressor section. Discharge fluid may exit the exhaust section.

A combustion reaction is contained inside of the combustion chamber to avoid heat damage to other portions of the turbine engine. A heat shield may be positioned on, and/or included in, the combustor dome. Such a heat shield is known as a combustor dome heat shield. Alternatively, the heat shield may be positioned on or included in a liner of the combustor to aid in providing thermal protection to other portions of the turbine engine. Such a heat shield is known as a combustor heat shield. Generally, the heat shield is mounted against the dome or is part of the liner so that the heat shield is spaced-apart from a combustor outer casing and/or other shell layer by a support system such that cooling air may circulate between the heat shield and the shell layer as will be described further below. The heat shield may comprise a plurality of threaded studs or bosses for extending through the combustor outer casing, wherein the studs secure the heat shield to the liner or the combustor dome. The heat shield may comprise any of a variety of high-temperature resistant materials, for example a material that is stable at temperatures exceeding 1200° C., such as ceramics, oxides of early transition metals, ceramic matrix composites, reinforced carbon-carbon materials, nitrides, carbides, borides, and carbides, among others.

The heat shield has a first surface (for example, a front face) and a second surface (for example, a back face), where the first surface is the portion of the heat shield facing the combustion chamber and the second surface is opposite the first surface. A primary means of cooling the shield may be by way of convection with a surrounding fluid or medium, such as air. The cooling fluid, such as air, may flow over the second surface of the heat shield. In the case of the combustor heat shield, the cooling fluid may flow from the second surface of the heat shield into the combustion chamber through one or more holes or openings. In other words, the heat shield may include multiple effusion holes.

Figure 2:
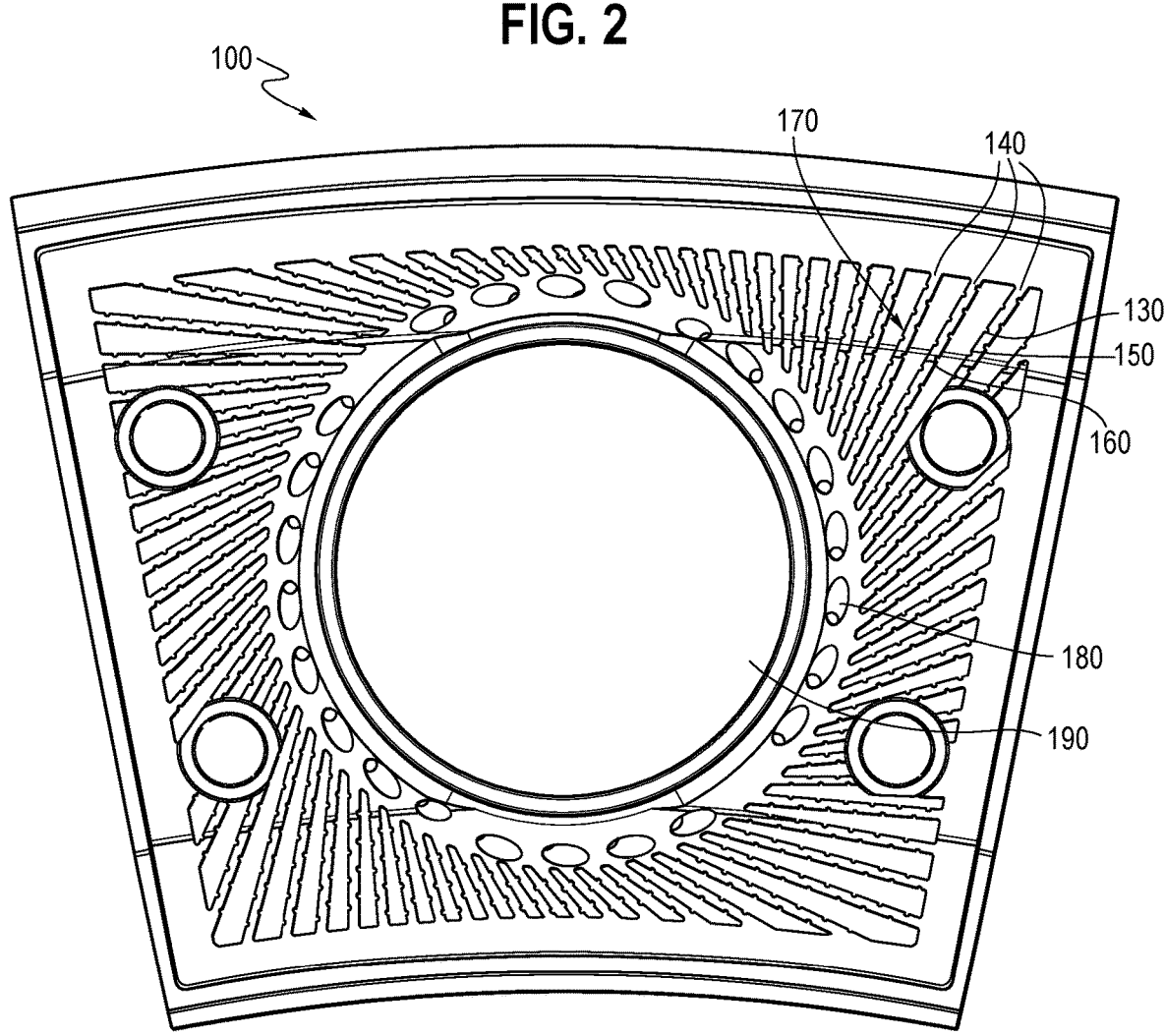
FIG. 2 illustrates a combustor dome heat shield with turbulators and radially offset channels.

FIGS. 1 and 2 illustrate two examples of combustor heat shields having turbulators 130 (only one of the turbulators is identified by a lead line in the figures) and radial channels 140 (only a subset are identified by lead lines in the figures) directed at a fuel nozzle opening 190. In these two illustrated examples, the radial channels 140 are arranged on a second surface 120 of the heat shield 100 that is opposite a first surface (not shown) that faces the combustion chamber. In other words, the first surface is the surface of the heat shield is to face the combustion chamber, whereas the second surface 120 is opposite the first surface and faces away from the combustion chamber. For example, the second surface 120 of the heat shield 100 may face in an upstream direction relative to the primary flow path of the gas turbine engine.

Each of the channels 140 is defined by a first side 150, a second side 160, and a channel base 170 that extends along the second surface 120 of the heat shield 100. The first side 150 and the second side 160 of the channel 140 may be opposing sides of the channel. In FIG. 1, the channels 140 extend radially inward toward a point 110 within the plane of the second surface 120 or in a plane that is parallel to the second surface 120. In some examples, the point 110 may be at the center of the fuel nozzle opening 190. The width of each of the channels 140 may be substantially constant as illustrated in FIG. 1. The width is considered substantially constant if the width varies within a maximum width and a minimum width, and the maximum width is no more than 15 percent larger than the minimum width. Alternatively or addition, the width of each of the channels 140 may vary from channel to channel, and/or vary from an inlet of each channel 140 to an outlet of the respective channel 140. The first side 150 and the second side 160 of the channel 140 may be substantially parallel to one another. The opposing sides 150 and 160 of the channel 140 are considered to be substantially parallel if the two planes formed by the two sides 150 and 160 of the channel 140 intersect at an acute angle less than or equal to 10 degrees.

The length of the channel 140, which is the distance from the inlet of the channel 140 to the outlet of the channel 140, may be at least 60 percent of the distance that the cooling air travels along a path on the heat shield 100, where the path includes the channel 140. The path on the heat shield 100 that the cooling air travels may be from a point where the cooling air that enters the inlet of the channel 140 comes into contract with the heat shield 100 to a point where the cooling air that exits the outlet of the channel exits the heat shield 100. Alternatively or in addition, one or more of the channels 140 may have a length that is at least 80 percent of the distance that the cooling air travels along a path on the heat shield 100. Alternatively or in addition, one or more of the channels 140 may have a length that is less than 60 percent of the distance that the cooling air travels along a path on the heat shield 100.

One or more of the channels 140 has at least one turbulator 130. The turbulator 130 may extend into the channel 140. Alternatively or in addition, the turbulator 130 may comprise a recess into one of the sides 150, 160 of the channel. The turbulator 130 disrupts air flow through the channel. The turbulator 130 may be any suitable shape, including, for example, pyramidal, ramp-shaped, curved, rectangular, irregular, or other shapes. Similarly, the turbulator 130 may be any size including, but not limited to, extending part of the way across the channel 140, extending fully across the channel, extending a portion of the depth of the channel, or extending the entire depth of the channel. However, the turbulator 130 does not completely fill the space of the channel 140 so as to completely block the channel 140 and prevent the air from passing through the channel 140. As the air passes through one or more of the channels 140 towards the fuel nozzle opening 190, the turbulator 130 in the channel 140 swirls or otherwise disturbs the air, causing an increase in convection cooling of the heat shield 100. The channel 140 may include the turbulator 130 without including any cooling pins or cooling fins. In the examples illustrated in FIGS. 1 and 2, the channels 140 do not include any cooling pins or cooling fins. Instead, the channels 140 include the turbulators 130, where the turbulators 130 comprise projections from the sides 150 and 160 of the channels 140. In alternative examples, the channels 140 may traverse a first portion of the second surface 120 of the heat shield 100, and cooling pins and/or cooling fins may be positioned in second portion of the second surface 120 of the heat shield 100.

Figure 4:
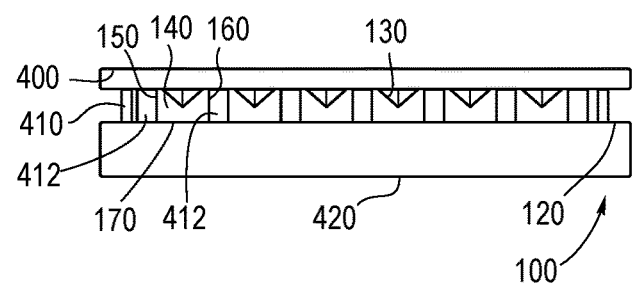
FIG. 4 illustrates a cross-sectional view of a combustor dome heat shield with turbulators.
Figure 5:
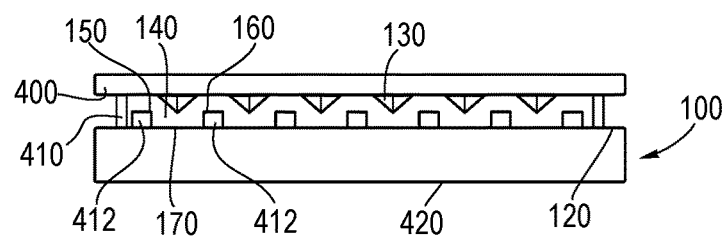
FIG. 5 illustrates a cross-sectional view of a combustor dome heat shield with turbulators.

The turbulator 130 may be positioned on the first side 150 of the channel 140, the second side 160 of the channel 140, the channel base 170, or some combination thereof. Alternatively or in addition, as shown in FIGS. 4 and 5, the turbulator 130 may be positioned on a surface of a component that faces the surface 120 on which the channel 140 is located. The surface of such a component—along with the first side 150 of the channel 140, the second side 160 of the channel 140, and the channel base 170—may define the channel 140.

In the examples shown in FIGS. 1 and 2, each of the channels 140 includes a plurality of the turbulators 130 arranged along both the first side 150 and the second side 160 of the channel 140. The turbulators 130 on each respective side 150 or 160 may be substantially uniformly spaced apart from each other. Alternatively, the turbulators 130 on each respective side 150 or 160 may be variably spaced apart from each other. Each of the turbulators 130 in the illustrated examples comprises a projection from a respective one of the sides 150 and 160 into the channel 140. As illustrated in FIGS. 1 and 2, the turbulators 130 along one of the sides 150 or 160 of the channel 140 may be offset from the turbulators 130 on the opposing one of the sides 150 or 160.

In some examples, the heat shield 100 may be a combustor dome heat shield that includes an aperture 180 positioned between one or more of the channels 140 and the fuel nozzle opening 190. The aperture 180 is an inlet to a passageway, which passes through the heat shield 100 from the second surface 120 to the first surface, allowing the cooling air to pass from the channels 140 into the combustion chamber. In some examples, such as illustrated in FIGS. 1 and 2, the heat shield 100 may include multiple such apertures arranged in a circle that circumscribes the fuel nozzle opening 190.

In the example depicted in FIG. 1, the channels 140 are arranged about the point 110 within the plane of the second surface 120 of the heat shield 100 so that the channels extend toward the point 110 and direct the flow of air towards this point 110. In contrast, in the example depicted in FIG. 2, the channels 140 are positioned in an offset radial arrangement such that channels are configured to direct the flow of air to a tangent of a shape on the second surface 120 and/or tangent to a shape in a plane parallel to the second surface 120. In the offset radial arrangement, a longitudinal axis of each respective one of the channels is tangent to a shape on a plane parallel with the second surface The shape may be within, and smaller than, the fuel nozzle opening 190. The shape may be a circle or any other shape. In some examples, the channels 140 may be arranged in a spiral shape and each of the outlets of the channels 140 open towards the fuel nozzle opening 190 or other opening.

Each of the channels 140 may have a longitudinal axis that runs parallel to the second surface 120 of the heat shield 100. Alternatively or in addition, each of the channels 140 may have a longitudinal axis that runs parallel to a plane that is parallel to the second surface 120 of the heat shield 100. Alternatively or in addition, all or a portion of the second surface 120 of the heat shield 100 may not lie in a single plane, and one or more of the channels 140 may conform to the second surface 120.

Figure 3:
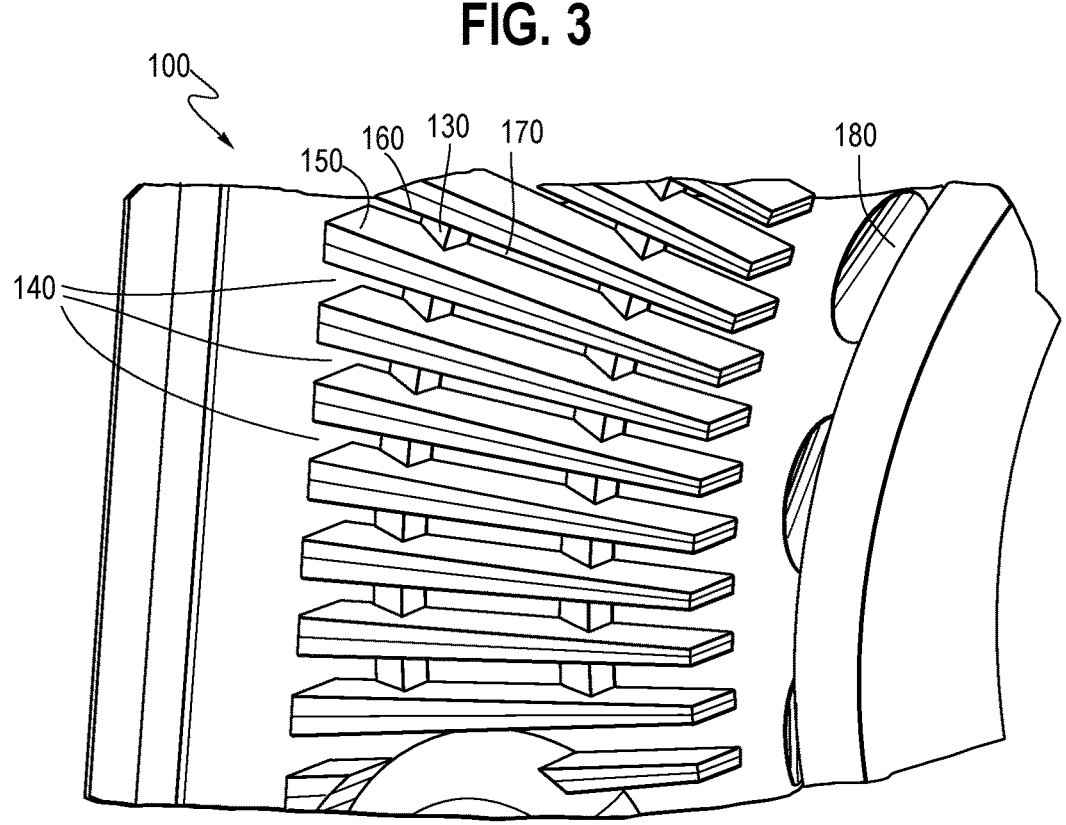
FIG. 3 illustrates a portion of a combustor dome heat shield with turbulators spanning the width of the channels.

FIG. 3 is a perspective view of a portion of the heat shield 100 in which turbulators 130 are ramps that span the width of the channels 140. For example, as depicted in FIG. 3, the turbulators 130 may span from the first side 150 to the second side 160 of the channel 140. The turbulators may be attached to and/or flush with the channel base 170.

In some examples, the heat shield 100 may have a shell layer 400 positioned facing the second surface 120. Spacers 410 (only one spacer is indicated by a lead line in the figures) extend from the second surface 120 of the heat shield 100 to the shell layer 400. The spacers 410 may maintain a gap between the shell layer 400 and the heat shield 100 so that air may flow over the second surface 120. FIGS. 4 and 5 are cross-sectional views of the heat shield 100 with turbulators 130 and the shell layer 400. As illustrated in FIGS. 4 and 5, each of the turbulators 130 extend from the shell layer 400 into a corresponding one of the channels 140. Each of the turbulators 130 extend into the corresponding one of the channels 140, but no so far as to contact the second surface 120.

In the examples shown in FIGS. 4 and 5, the depth of each channel 140 is equal to the distance that corresponding raised portions 412 of the heat shield 100 extend away from the second surface 120 of the heat shield 100. The height of the raised portions 412 of the heat shield 100 is different in FIG. 4 than in FIG. 5. In the example illustrated in FIG. 4, the depth of the channel is equal to the height of the spacer 410, which maintains the gap between the second surface 120 and the shell layer 400. However, in the example illustrated in FIG. 5, the depth of the channel is less than the height of the spacers 410, allowing for additional space between the channel 140 and the shell layer 400.

In an alternative example, the heat shield 100 may be configured without the fuel nozzle opening 190 and without the apertures 180 entirely. In such an example, the heat shield 100 comprises a single plate of material without gaps or outlets for air. Air may flow over the second surface 120 of the heat shield 100 until it reaches an edge of the heat shield 100. In this example, the heat shield 100 may still be cooled by convection. The channels 140 may be positioned on the second surface 120 of the heat shield 100 directing the flow of air over the second surface 120. The channels 140 may be positioned in a radial or off-set radial arrangement as described above, or may be positioned so that the channels 140 direct the flow of air to a point that is not on the second surface 120, thus allowing air to readily flow off an outside edge of the heat shield 100. The heat shield 100 is an apparatus.

The channel 140 has at least one turbulator 130 which extends into the channel. The turbulator 130 disrupts air flow through the channel. As discussed above, the turbulator 130 may be of a variety of shapes and sizes. As the air passes through the channels 140, the turbulator 130 turbulates the air, causing an increase in convection cooling of the heat shield 100.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The subject-matter of the disclosure may also relate, among others, to the following aspects:

1. An apparatus comprising:
   a heat shield of a combustor, the heat shield comprising a first surface and a second surface, wherein the first surface is configured to face a combustion chamber, and the second surface is opposite the first surface;
   a plurality of channels located on the second surface of the heat shield; and
   a turbulator included in a channel, the channel included in the channels.
2. The apparatus of aspect 1, wherein the heat shield protects a combustor dome.
3. The apparatus of aspect 1, wherein the heat shield is included in a liner of the combustion chamber.
4. The apparatus of any of aspects 1 to 3, wherein the channels extend radially inward toward a point in a plane parallel to the second surface of the heat shield.
5. The apparatus any of aspects 1 to 4, wherein the heat shield is a combustor dome heat shield and comprises a fuel nozzle opening.
6. The apparatus of aspect 5, wherein the channels extend radially inward toward a point within the fuel nozzle opening.
7. The apparatus of any of aspects 1 to 6, wherein the channel includes a plurality of turbulators.
8. The apparatus of any of aspects 1 to 7, wherein the turbulator includes a ramp, a projection into the channel from a side of the channel, and/or a recess in the side of the channel.
9. The apparatus of any of aspects 1 to 8 further comprising a plurality of turbulators, the turbulator included in the plurality of turbulators, each respective turbulator included in a corresponding one of the channels.
10. The apparatus of any of aspects 1 to 9, wherein the turbulator is located on the second surface of the heat shield and the turbulator spans the width of the channel.
11. The apparatus of any of aspects 1 to 9 further comprising a shell layer positioned to face the second surface of the heat shield, wherein the turbulator is fixed to the shell layer and extends into the channel.
12. The apparatus of any of aspects 1 to 11, wherein the channels are positioned in an offset radial arrangement.
13. The apparatus of aspect 12, wherein in the offset radial arrangement, a longitudinal axis of each of the channels is tangent to a circle on a plane parallel with the second surface.
14. The apparatus of any of aspects 1 to 13, wherein the channels do not include cooling pins or cooling fins.
15. The apparatus of any of aspects 1 to 14, further comprising an aperture passing through the heat shield, wherein the aperture is positioned between an outlet of the channel and a fuel nozzle opening in the heat shield.
16. The apparatus of any of aspects 1 to 15, further comprising a plurality of apertures passing through the heat shield, wherein the apertures are positioned between outlets of the channels and a fuel nozzle opening in the heat shield.

17. A method comprising:
cooling a heat shield of a combustor, wherein the heat shield comprises a first surface and a second surface, the first surface is opposite the second surface, and the first surface is configured to face a combustion chamber, wherein cooling the heat shield includes directing airflow over the heat shield through a plurality of channels towards an opening in the heat shield and past turbulators located in the channels.

18. The method of aspect 17, wherein opposing sides of each of the channels are substantially in parallel with each other.

19. The method of any of aspects 17 to 18, wherein a width of each of the channels is substantially constant from an inlet of a respective one of channels to an outlet of the respective one of the channels.

20. The method of any of aspects 17 to 19, wherein the turbulators span the width of the channel.

What is claimed is:

1. An apparatus comprising:
a heat shield of a combustor, the heat shield comprising a first surface and a second surface, wherein the first surface is configured to face a combustion chamber, and the second surface is opposite the first surface;
a plurality of channels located on the second surface of the heat shield; and
a turbulator included in a channel, the channel included in the channels, wherein the channels are positioned in an offset radial arrangement, wherein in the offset radial arrangement, a longitudinal axis of each of the channels is tangent to a circle on a plane parallel with the second surface.

2. The apparatus of claim 1, wherein the heat shield is configured to protect a combustor dome.

3. The apparatus of claim 1, wherein the heat shield is included in a liner of the combustion chamber.

4. The apparatus of claim 1 wherein the heat shield is a combustor dome heat shield and comprises a fuel nozzle opening.

5. The apparatus of claim 1, wherein the channel includes a plurality of turbulators.

6. The apparatus of claim 1, wherein the turbulator includes a ramp, a projection into the channel from a side of the channel, and/or a recess in the side of the channel.

7. The apparatus of claim 1 further comprising a plurality of turbulators, the turbulator included in the plurality of turbulators, each respective turbulator included in a corresponding one of the channels.

8. The apparatus of claim 1, wherein the turbulator is located on the second surface of the heat shield and the turbulator spans the width of the channel.

9. The apparatus of claim 1 further comprising a shell layer positioned to face the second surface of the heat shield, wherein the turbulator is fixed to the shell layer and extends into the channel.

10. The apparatus of claim 1 wherein the channels do not include cooling pins or cooling fins.

11. The apparatus of claim 1 further comprising an aperture passing through the heat shield, wherein the aperture is positioned between an outlet of the channel and a fuel nozzle opening in the heat shield.

12. The apparatus of claim 1 further comprising a plurality of apertures passing through the heat shield, wherein the apertures are positioned between outlets of the channels and a fuel nozzle opening in the heat shield.

13. A method comprising:
cooling a heat shield of a combustor, wherein the heat shield comprises a first surface and a second surface, the first surface is opposite the second surface, and the first surface is configured to face a combustion chamber, wherein cooling the heat shield includes directing airflow over the heat shield through a plurality of channels towards an opening in the heat shield and past turbulators located in the channels, wherein the channels are positioned in an offset radial arrangement, wherein in the offset radial arrangement, a longitudinal axis of each of the channels is tangent to a circle on a plane parallel with the second surface.

14. The method of claim 13, wherein opposing sides of each of the channels are substantially in parallel with each other.

15. The method of claim 13, wherein a width of each of the channels is substantially constant from an inlet of a respective one of channels to an outlet of the respective one of the channels.

16. The method of claim 13, wherein the turbulators span the width of the channel.

* * * * *